US006353310B1

United States Patent
Wang

(10) Patent No.: US 6,353,310 B1
(45) Date of Patent: Mar. 5, 2002

(54) DC/DC CHARGE AND SUPPLY CONVERTING MODULE

(76) Inventor: Tongt-Huei Wang, No. 17, Wu-Chuan 6th Rd., Wu-Ku Industrial Park, Taipei Hsien (TW)

( * ) Notice: Subject to any disclaimer, the term of this patent is extended or adjusted under 35 U.S.C. 154(b) by 0 days.

(21) Appl. No.: 09/521,294

(22) Filed: Mar. 9, 2000

(51) Int. Cl.[7] ................................. G05F 1/40
(52) U.S. Cl. ..................... 323/285; 323/284
(58) Field of Search ................ 323/273–275, 323/281, 282–285; 320/127, 135, 140

(56) References Cited

U.S. PATENT DOCUMENTS 5,079,497 A * 1/1992 Barbu et al. ............... 323/281

* cited by examiner

Primary Examiner—Peter S. Wong
Assistant Examiner—Gary L. Laxton
(74) Attorney, Agent, or Firm—Alan Kamrath; Rider, Bennett, Egan & Arundel, LLP

(57) ABSTRACT

A DC/DC charge and supply converting module has a function of constant-current charging an electrical appliance, and a function of supplying constant voltage power to an electrical appliance. The converting module includes a DC/DC converter and a charge module connected with an input end of the DC/DC converter. The charge module includes a comparator, a constant current source connected with a first input end of the comparator, and a bleeder circuit connected to a second input end of the comparator. The comparator is used for controlling an output voltage of the DC/DC converter to remain constant. The constant current source provides a constant current to the corresponding input end of the comparator and allows the DC/DC converter to output a constant current for the purpose of charge.

5 Claims, 4 Drawing Sheets

DC/DC CHARGE AND SUPPLY CONVERTING MODULE

FIELD OF THE INVENTION

The present invention relates to a DC/DC charge and power supply converting module, and more particularly to an integrated converter which can be used as a regulated power supply and a DC/DC charger.

DESCRIPTION OF THE RELATED ART

It is well known that all electric appliances are operated under either one or both of two kinds of power supply, the DC (direct current) supply and the AC (alternating current) supply. For some small household appliances, such as a mobile phone and a digital camera, direct current is used as the power by utilizing a rechargeable battery. In order to charge the battery when its capacity is used up, two kinds of chargers, the AC/DC charger and the DC/DC charger, can be used. Since the AC/DC charger only can be used in-house as it must be associated with an AC supply, the DC/DC charger is more useful as its use is not restricted in the way of the AC/DC charger. On the other hand, most of the small electrical appliances are supplied with power by a relatively low voltage. To operate the small electrical appliances, a DC/DC converter is required for converting a high voltage to such a low voltage.

To meet the above needs, various DC/DC converters have been developed. However, conventional DC/DC converters have several disadvantages. First, a conventional DC/DC converter generally comprises a number of parts and elements so that a large circuit board is necessary for combining these elements, thereby resulting in a relative large volume of the converter. To solve this problem, the DC/DC converter has to be separated from and electrically connected with the electrical appliance, as an independent module. Secondly, as mentioned above, the construction of the DC/DC converter is relatively complicated. Therefore, it is hard to improve efficiency during the production process of the converter. Furthermore, a conventional DC/DC converter can output only a single voltage. Therefore, it can not meet the demands of multiple voltages in actual use. Although certain types of DC/DC converters have been developed which are able to output multiple voltages, they are still found unsatisfactory in operation because switching between the multiple voltages is accomplished by addition of a plurality of switches. Obviously, the structure of the converter becomes more complicated.

SUMMARY OF THE INVENTION

The main object of the present invention is to provide a DC/DC charge and supply converting module which has a function of constant-current charging an electrical appliance.

A second object of the present invention is to provide a DC/DC charge and supply converting module which has a function of supplying constant-voltage power to an electrical appliance.

In accordance with one aspect of the present invention, the DC/DC charge and supply converting module comprises a DC/DC converter and a charge module connected with a control end and an output end of the DC/DC converter. The charge module includes a comparator having an output end connected to the control end of the DC/DC converter, a constant current source having an input end acting as a measuring end for measuring a voltage across a rechargeable battery, and an output end connected to a first input end of the comparator, a bleeder circuit having an input end acting as a feedback signal end, and an output end connected to a second input end of the comparator.

In accordance with another aspect of the present invention, the DC/DC converter comprises two driving transistors respectively connected between an input supply and an output end thereof for controlling an output voltage, a latch circuit composed of an RS inverter and having an output connected to a base electrode of one of the driving transistors, an AND gate having an output end connected to an input end S of the latch circuit, a surge wave absorber having an input end connected with the input supply and an output end connected with a first input end of the AND gate and an input end R of the latch circuit; and a comparator having an output end connected to a second input end of the AND gate, a negative input end being supplied with a reference voltage by the charge module, and a positive input end connected with the charge module and acting as a control end, and a reference voltage generator for supplying a reference voltage to the surge wave absorber.

In accordance with a further aspect of the present invention, the constant current source is composed of a first and a second transistor, and a bleeder circuit used for measuring a charge voltage. The bleeder circuit includes a first and a second divider resistor, an input end of the bleeder circuit being used as a measuring end (FDBK) connected to a battery of an electrical appliance for measuring a battery voltage, a base and a collecting electrode of the first transistor being interconnected and coupled to a negative input end of the comparator and an output end of the bleeder circuit, a base and a collecting electrode of the second transistor being interconnected and coupled with an emitting electrode of the first transistor via a resistor, an emitting electrode of the second transistor being connected with the base electrode of the first transistor and the negative input end of the comparator.

BRIEF DESCRIPTION OF THE ACCOMPANIED DRAWINGS

DETAILED DESCRIPTION OF THE PREFERRED EMBODIMENT

Figure 1:
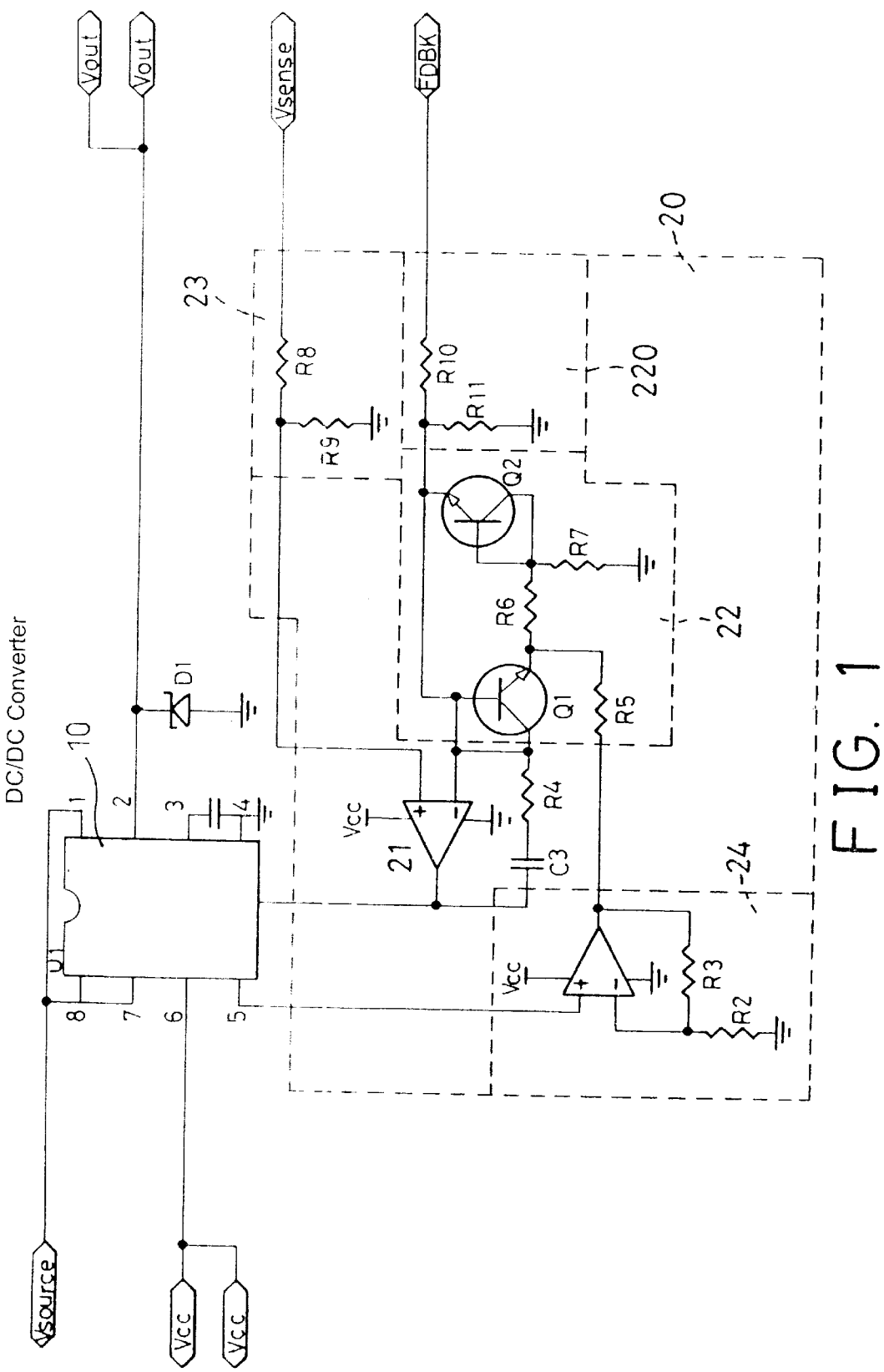
FIG. 1 is a circuit diagram of a preferred embodiment in accordance with the present invention.

Referring to FIG. 1, a DC/DC charge and supply converting module in accordance with the present invention includes a DC/DC converter (10) and a charge module (20). The DC/DC converter (10) is provided for supplying power to an electric appliance or charging the electric appliance. The DC/DC converter (10) has a control end connected with the charge module (20) to feedback and adjust an output voltage and current thereof. The DC/DC converter (10) further has a plurality of pins in which a first pin (1), a seventh pin (7), and an eighth pin (8) are respectively connected with an input DC supply (Vsource), a sixth pin (6) acts as an operation supply end (Vcc) and a second pin (2) acts as an output end (Vout).

Figure 2:
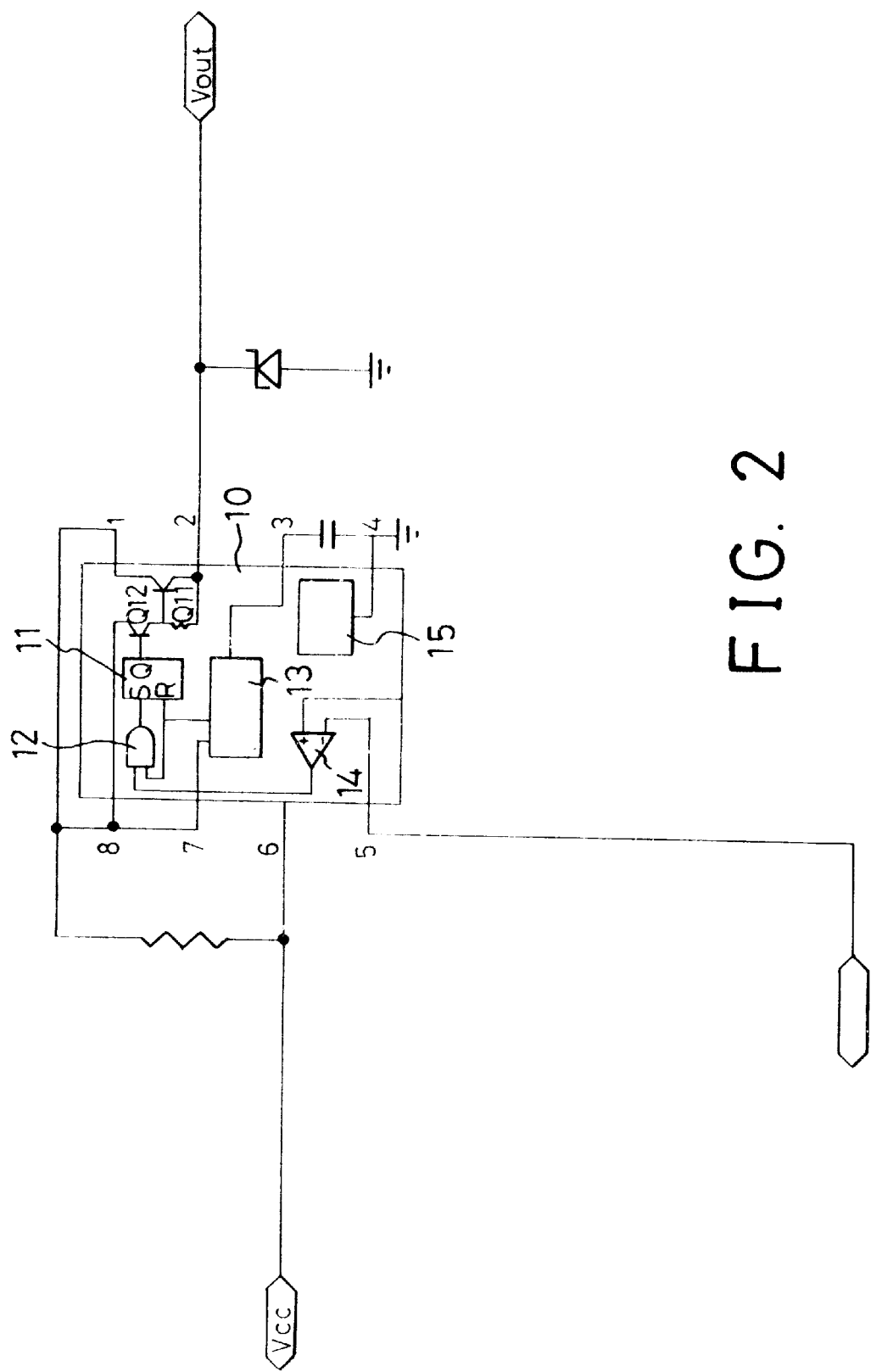
FIG. 2 is a circuit diagram showing a DC/DC converter of the preferred embodiment of FIG. 1.

The detailed circuit layout of the DC/DC converter (10) now will be described with reference to FIG. 2. From FIG.

2, it can be seen that the DC/DC converter (10) includes two driving transistors (Q11) and (Q12) respectively connected between the input supply (Vsource) and the output end (Vout) for controlling the output voltage.

The DC/DC converter (10) further includes a latch circuit (11), an AND gate (12), a surge wave absorber (13), a comparator (14) and a reference voltage generator (15).

The latch circuit (11) is composed of an RS inverter and has an output connected to a base of the driving transistor (Q12). The AND gate (12) has an output end connected to an input end S of the latch circuit (11).

The surge wave absorber (13) has an input end connected with the input supply (Vsource) and an output end connected with a first input end of the AND gate (12) and an input end R (reset end) of the latch circuit (11).

The comparator (14) has an output end connected to a second input end of the AND gate (12). A negative input end of the comparator (14) is supplied with a reference voltage by the charge module (20) and a positive input end of the comparator (14) is connected with the charge module (20) to act as a control end.

The reference voltage generator (15) is provided for supplying a reference voltage to the surge wave absorber (13).

Returning to FIG. 1, the charge module (20) of the DC/DC charge and supply converting module includes a comparator (21), a constant current source (22), a first bleeder circuit (23) used for measuring a constant voltage, and a reference voltage providing and current offsetting circuit (24) used for providing the DC/DC converter (10) with a reference voltage and offsetting a constant current to the constant current source (22).

The comparator (21) has an output end connected to the control end of the DC/DC converter (10). The comparator (21) further has a negative input end and a positive input end.

The constant current source (22) is connected to the negative input end of the comparator (21). In a preferred embodiment of the present invention, the constant current source (22) is composed of a first and a second transistors (Q1), (Q2), and a second bleeder circuit (220) used for measuring a charge voltage. The second bleeder circuit (220) includes first and second divider resistors (R10) and (R11). An input end of the second bleeder circuit (220) is used as a measuring end (FDBK) connected to a battery of an electrical appliance for measuring a battery voltage. A base and a collecting electrode of the first transistor (Q1) are interconnected and coupled to the negative input end of the comparator (21) and an output end of the second bleeder circuit (220). A base and a collecting electrode of the second transistor (Q2) are interconnected and coupled with an emitting electrode of the first transistor (Q1) via a resistor (R6). An emitting electrode of the second transistor (Q2) is connected with the base electrode of the first transistor (Q1) and the negative input end of the comparator (21).

The first bleeder circuit (23) is connected with the positive input end of the comparator (21) and has a first divider resistor (R8) and a second divider resistor (R9). An input end of the first bleeder circuit (23) is used as a feedback signal end (Vsense) and an output end thereof is connected with the positive input end of the comparator (21).

The reference voltage providing and current offsetting circuit (24) is composed of an operational amplifier. An input end of the reference voltage providing and current offsetting circuit (24) is connected to the negative input end of the comparator (14) of the DC/DC converter (10) to provide a reference voltage. An output of the reference voltage providing and current offsetting circuit (24) is connected with the emitting electrode of the first transistor (Q1) of the constant current source (22) via a resistor (R3) for current offset.

From the above description, the circuit layout of the DC/DC charge and supply converting module can be readily understood.

In operation, the DC/DC charge and supply module can be used with a cigarette lighter disposed within a car, or any other external DC supply with a voltage of 10 V to 17 V. The operation supply end (Vcc) and the input DC supply (Vsource) of the DC/DC converter (10) are connected with the external DC supply and receive DC output from the DC supply. After a converting operation of the DC/DC charge and supply module, a converted DC voltage will be output from the output end (Vout) of the DC/DC converter (10). An operation frequency of the converter module is 50 KHz.

As mentioned above, the DC/DC charge and supply module includes a function of constant-current charging an electrical appliance, and a function of supplying constant-voltage power to an electrical appliance.

In order to achieve the function of constant-current charging an electrical appliance, the measuring end (FDBK) of the charge module (20) measures a voltage across the rechargeable battery of the electrical appliance and outputs the voltage to the second bleeder circuit (220) for voltage dividing. Then, the divided voltage is applied to the first and second transistors (Q1) and (Q2). When the connection point of the base and collecting electrodes of the first transistor (Q1) is applied with the divided voltage, a break-over current will flow to the second transistor (Q2) via the resistor (R6). In such a case, the first transistor (Q1) is equivalent to a Zener diode which allows the base electrode of the second transistor (Q2) to receive a constant current. Therefore, a constant current source will be formed between the collecting and emitting electrodes of the second transistor (Q2). On the other hand, the negative input end of the comparator (21) will be applied with a constant voltage due to the Zener diode effect of the first transistor (Q1). The positive input end of the comparator (21) is connected with the feedback signal end (Vsense) via the first bleeder circuit (23). Since the feedback signal end (Vsense) is open and the second divider resistor (R9) is grounded, the voltage of the negative input end of the comparator (21) is higher than that of the positive input end. Therefore, a negative signal will be amplified and will be output to the DC/DC converter (10) in order to be compared and amplified by the comparator (14). Then, the comparatively amplified negative signal will be output by the latch circuit (11) via the AND gate (12) in order to conduct the driving transistors (Q11) and (Q12). In this way, the output current flow can be controlled and remain constant to meet the needs of charging.

In order to achieve the function of supplying constant-voltage power to an electrical appliance, the feedback signal end (Vsense) is bridgedly connected with the output end (Vout) of the DC/DC converter (10). In such a case, an output voltage will be divided by the first bleeder circuit (23) via the feedback signal end (Vsense), and then applied to the positive input end of the comparator (21). Since the measuring end (FDBK) of the charge module (20) is open, the voltage of the positive input end of the comparator (21) is higher than that of the negative input end. Therefore, a high voltage will be output to the DC/DC converter (10) in order to be compared and amplified by the comparator (14). Then, the comparatively amplified high voltage will be output by the latch circuit (11) via the AND gate (12) in order to conduct the driving transistors (Q11) and (Q12). In this way, the output voltage can be controlled to remain constant.

In another preferred embodiment, the DC/DC charge and supply converting module in accordance with the present invention further can achieve a DC/DC converting with different current values by bridgedly connecting a resistor with a different resistance between the feedback signal end (Vsense) and the output end (Vout).

In addition to the above functions, the DC/DC charge and supply converting module further has a function of surge wave absorption. As mentioned above, the input of the surge wave absorber (13) is connected with the input DC supply (Vsource). If the output end of the power supply becomes short circuited, the current flow to the surge wave absorber (13) will be boosted up and output a signal to the latch circuit (11) for latching when the boosted current exceeds a current limit. Then, the driving transistors (Q11), (Q12) can not be conducted and the voltage output will be terminated. In this way, protection to the converting module and the electrical appliance can be obtained.

Figure 3:
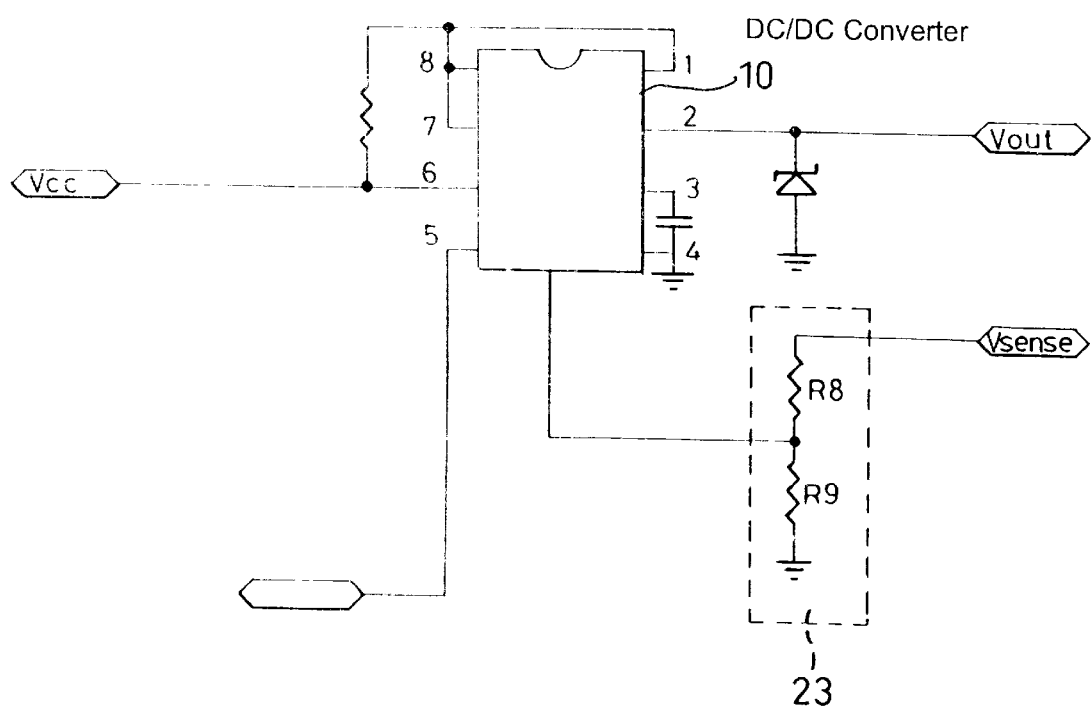
FIG. 3 is a partial circuit diagram of a second preferred embodiment of the present invention.

FIG. 3 shows a partial circuit diagram of a second preferred embodiment of the present invention. In this embodiment, the bleeder circuit (23) is separated from the charge module (20). An output end of the bleeder circuit (23) is connected with the control end of the DC/DC converter (10) and an input end thereof acts as a feedback signal end (Vsense). With this arrangement, the same effect of power supply with constant voltage can be attained.

Figure 4:
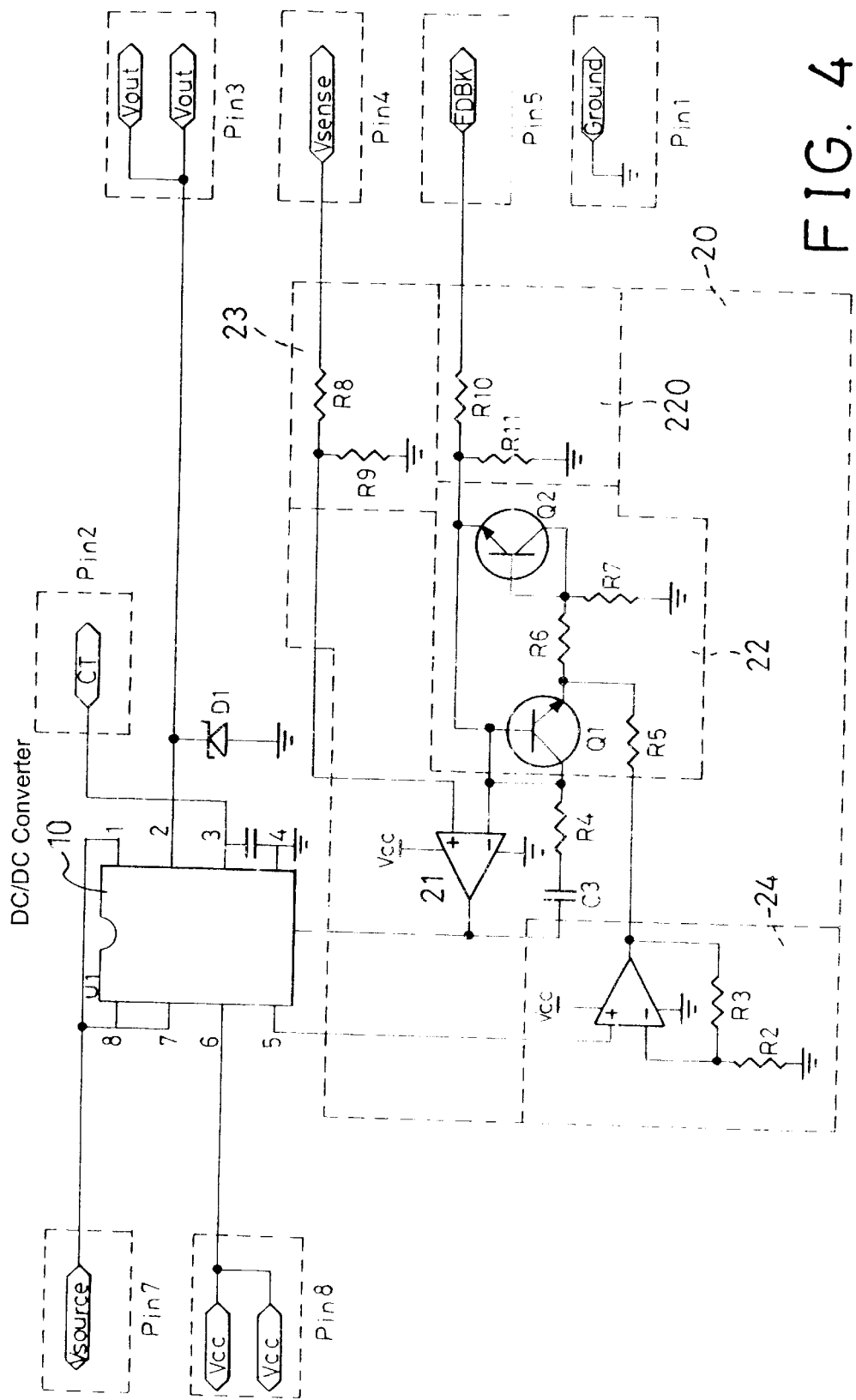
FIG. 4 is a circuit diagram showing an integrated circuit of the DC/DC converter of the present invention.

FIG. 4 shows a circuit of the DC/DC charge and supply converting module which is integrated in accordance with a preferred embodiment of the present invention. It can be seen from the figure that integrated circuit of the DC/DC charge and supply converting module is configured with an 8-pin IC (a sixth pin 6 of the IC is blank, which is not shown in FIG. 4). Because of the small volume of the 8-pin IC, the DC/DC charge and supply converting module can be easily assembled and installed within the electrical appliance.

I claim:

1. A DC/DC charge and power supply converting module comprising:

a DC/DC converter having a control end and an output end;

a charge module connected with the control end and the output end of the DC/DC converter, wherein the charge module includes:

a comparator having an output end connected to the control end of the DC/DC converter;

a first bleeder circuit having an input end acting as a feedback signal end, and an output end connected to a second input end of the comparator; and a constant current source comprising:

a first transistor;

a second transistor; and a second bleeder circuit including first and second divider resistors, wherein an input end of the first bleeder circuit is used as a measuring end (FDBK) which is adapted to connect to a battery of an electrical appliance for measuring a battery voltage, a base electrode and a collecting electrode of the first transistor are interconnected and coupled to a negative input end of the comparator and an output end of the first bleeder circuit, a base electrode and a collecting electrode of the second transistor are interconnected and coupled with an emitting electrode of the first transistor via a resistor, an emitting electrode of the second transistor being connected with the base electrode of the first transistor and the negative input end of the comparator.

2. The DC/DC charge and supply converting module as claimed in claim 1, wherein the DC/DC converter further comprises:

two driving transistors respectively connected between an input supply and an output end thereof for controlling an output voltage;

a latch circuit composed of an RS inverter and having an output connected to a base electrode of one of the driving transistors;

an AND gate having an output end connected to an input end S of the latch circuit;

a surge wave absorber having an input end connected with the input supply and an output end connected with a first input end of the AND gate and an input end R of the latch circuit;

a comparator having an output end connected to a second input end of the AND gate, a negative input end being supplied with a reference voltage by the charge module, and a positive input end connected with the charge module and acting as a control end; and a reference voltage generator for supplying a reference voltage to the surge wave absorber.

3. The DC/DC charge and supply converting module as claimed in claim 1, wherein the first bleeder circuit is connected to a positive input end of the comparator and has a first divider resistor and a second divider resistor, the input end of the first bleeder circuit being used as the feedback signal end and the output end thereof being connected to the positive input end of the comparator.

4. The DC/DC charge and supply converting module as claimed in claim 1, wherein the charge module further includes a reference voltage providing and current offsetting circuit used for providing the DC/DC converter with a reference voltage and offsetting a constant current to the constant current source, the reference voltage providing and current offsetting circuit being composed of an operational amplifier, an input end of the reference voltage providing and current offsetting circuit being connected to the negative input end of the comparator of the DC/DC converter to provide a reference voltage, an output of the reference voltage providing and current offsetting circuit being connected with the emitting electrode of the first transistor of the constant current source via a resistor for current offset.

5. The DC/DC charge and supply converting module as claimed in claim 4, wherein the charge module further includes a reference voltage providing and current offsetting circuit used for providing the DC/DC converter with a reference voltage and offsetting a constant current to the constant current source, the reference voltage providing and current offsetting circuit being composed of an operational amplifier, an input end of the reference voltage providing and current offsetting circuit being connected to the negative input end of the comparator of the DC/DC converter to provide a reference voltage, an output of the reference voltage providing and current offsetting circuit being connected with the emitting electrode of the first transistor of the constant current source via a resistor for current offset.

* * * * *